UNITED STATES PATENT OFFICE.

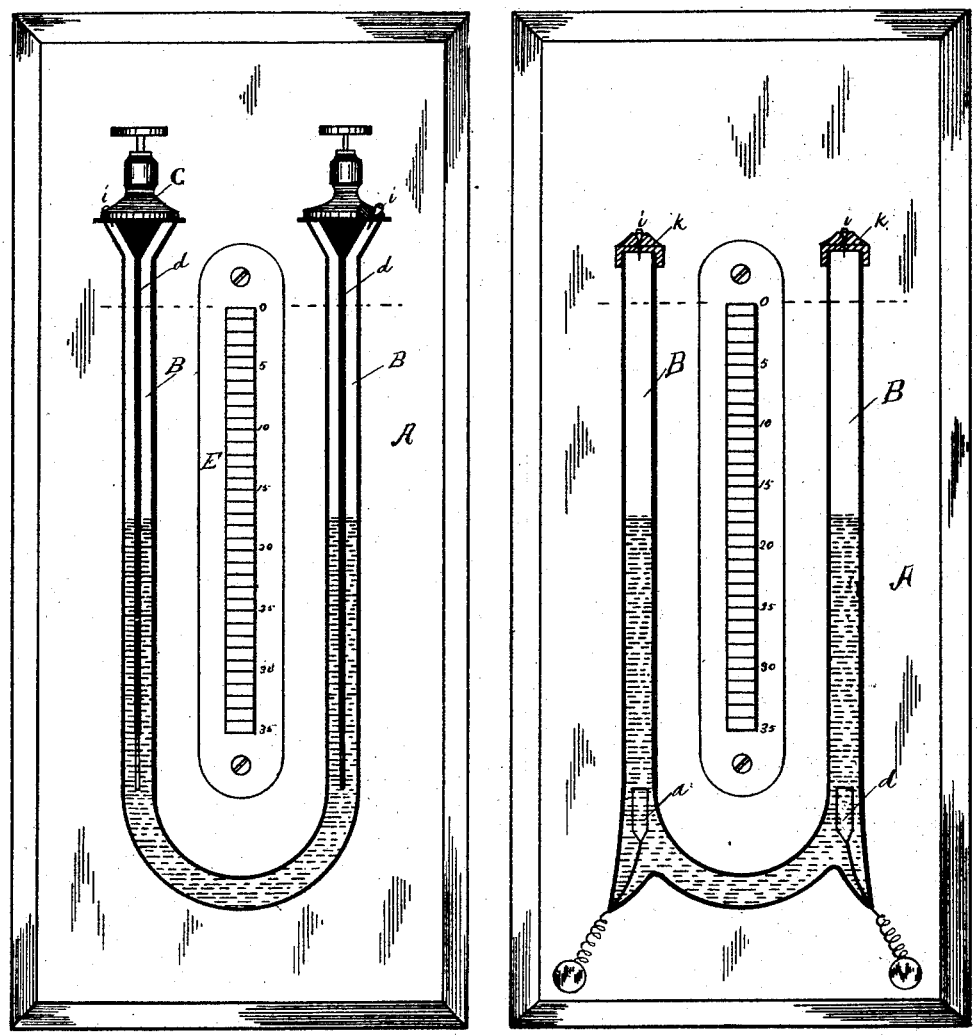

JOHN J. GREEN, OF BOONTON, NEW JERSEY, ASSIGNOR OF ONE-HALF TO H. C. WILLIS AND T. F. HUNTER, OF BROOKLYN, NEW YORK.

ELECTRIC-CURRENT METER.

SPECIFICATION forming part of Letters Patent No. 327,391, dated September 29, 1885.

Application filed July 8, 1885. (No model.)

*To all whom it may concern:*

Be it known that I, JOHN J. GREEN, of Boonton, in the county of Morris and State of New Jersey, have invented certain new and useful Improvements in Electric-Current Meters; and I do hereby declare that the following is a full, clear, and exact description of the invention, which will enable others skilled in the art to which it appertains to make and use the same, reference being had to the accompanying drawings, which form a part of this specification.

This invention has for its object the construction of an electric-current meter, which shall be of an exceedingly simple character, and shall be self-registering to the most accurate degree.

The principal forms of current-meter hitherto proposed are somewhat difficult of construction, require delicate and troublesome calibration, and are expensive—such, for instance, as are based upon the electro-decomposition of metallic salts, or the electro-deposition of metals, or the separation and measurement of the constituent gases composing water. The latter has been modified by introducing a floating receiver for the gases, the height of said receiver either directly indicating the current used or its upper and lower limits effecting a record. My invention differs from all these, although it is based upon the decomposition of a liquid by the current to be measured.

The invention consists, broadly, in a current-meter composed of a transparent tube or vessel adapted to contain a liquid, and provided with means for the passage of the current, and a scale of units adapted to indicate the current by the fall of the level of the said liquid consequent upon the loss effected by the decomposition.

The invention further consists in the arrangement and combination of devices, substantially as hereinafter fully described and claimed.

In the drawings, Figure 1 is an elevation of one form of my invention, and Fig. 2 shows a modification.

This consists of a suitable board or other base, A, to which I fix a U-shaped or two-branch glass tube, B. I prefer to make the open upper ends of the branches flaring or cup-shaped. I cover these with the binding-posts C, which may be rigidly cemented or screwed into position; or they may be arranged to close the openings by their weight. From each of these posts C depends into its corresponding branch of tube B an electrode, $d$, which extends downwardly nearly to the end of the branches, and, to prevent variation of surface by the fall of the contained liquid, I prefer to insulate the electrodes $d$ or their leaders from the posts C to such a point as will be beyond the maximum fall of the liquid, as shown in Fig. 1. This, by keeping the active electrodes always submerged, insures a constant resistance in the instrument, provided a constant degree of conductivity of the liquid is maintained, which is easy enough by the use of a standard liquid. The simplest liquid is water.

The scale E may be used in a variety of ways. By the laws of electrolysis a current will decompose an amount of water proportionally to the volume of current and the time during which it passes. Therefore, if the volume of water decomposed be known, the current may be ascertained; hence the scale may be marked in absolute units of volume—such as cubic centimeters—but, as it is desirable to have the scale indicate directly the current which has passed, the plan I prefer is to arrange the instrument in a known derivation of the current to be measured, and experimentally determine the amounts of water decomposed by the derivation-current per hour, from which a single multiplication by the constant of the instrument at once gives the amount of current which has passed over the main line. The indication is given on the scale E by the level of the liquid remaining in the instrument, the liquid being replenished with liquid when necessary till it rises exactly to the zero-point.

I prevent evaporation, while providing for the free escape of gases, by constructing for each of the branches of the tube B a small valve, $i$, opening outwardly, which allows the gases produced to freely escape, but prevents access of dry air to the tubes.

A separate filling-tube or funnel-stem may be provided in each branch; but the construction shown in Fig. 1 permits the removal of at least one binding-post and electrode for filling the exhausted tube B to the zero point.

In Fig. 2 I modify the form so as to place the electrodes $d$ permanently in the lower part of the tubes, leaving their upper ends to be closed by the valved caps $k$, as shown.

The instrument when completed is inclosed in a neat box (of wood or other material) which is fitted with a glass face, and a door with lock, to prevent tampering with the indicator.

I claim as my invention—

1. A current-meter comprising a vessel containing a liquid, having an outlet for the gases of decomposition, two electrodes, and a scale adapted to indicate the change of level due to the amount of liquid decomposed by the current, substantially as described.

2. A current-meter comprising a bi-branched transparent glass tube adapted to contain a liquid, having an outlet for the gases of decomposition, two electrodes therein, and a scale adapted to indicate the fall of level of said liquid due to the decomposition thereof, substantially as described.

3. In a current-meter adapted to indicate the current passed by the decomposition of a liquid and consequent fall of level of said liquid, the combination therewith of one or more valves adapted to permit escape of the gases formed but to prevent access of air to the interior of said meter, substantially as described.

4. The electric-current meter consisting of the bi-branched glass tube B, adapted to contain a liquid, having an outlet for the gases of decomposition, electrodes $d$, and the scale E, having its zero at the upper end, and then reading downwardly, substantially as described.

In testimony that I claim the foregoing as my own I have hereto affixed my signature in presence of two witnesses.

JOHN J. GREEN.

Witnesses:
CHARLES E. SIMMS, Jr.,
H. KIMPTON.